(12) United States Patent
Steinberg et al.

(10) Patent No.: US 8,265,399 B2
(45) Date of Patent: Sep. 11, 2012

(54) DETECTING ORIENTATION OF DIGITAL IMAGES USING FACE DETECTION INFORMATION

(75) Inventors: Eran Steinberg, San Francisco, CA (US); Yury Prilutsky, San Mateo, CA (US); Peter Corcoran, Claregalway (IE); Petronel Bigioi, Galway (IE); Leo Blonk, Tuam (IE); Mihnea Gângea, Bucharest (RO); Constantin Vertran, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 245 days.

(21) Appl. No.: 12/629,450

(22) Filed: Dec. 2, 2009

(65) Prior Publication Data

US 2010/0165150 A1   Jul. 1, 2010

Related U.S. Application Data

(63) Continuation of application No. 12/482,305, filed on Jun. 10, 2009, now Pat. No. 7,844,135, which is a continuation of application No. 11/024,046, filed on Dec. 27, 2004, now Pat. No. 7,565,030, which is a continuation-in-part of application No. 10/608,772, filed on Jun. 26, 2003, now Pat. No. 7,440,593.

(51) Int. Cl.
*G06K 9/62* (2006.01)
*G06K 9/00* (2006.01)
(52) U.S. Cl. ......... 382/216; 382/209; 382/115; 382/118
(58) Field of Classification Search .................. 382/165, 382/115–118, 181–231
See application file for complete search history.

(56) References Cited

U.S. PATENT DOCUMENTS

| 4,456,354 | A | 6/1984 | Mizokami |
| 4,690,536 | A | 9/1987 | Nakai et al. |
| 4,774,401 | A | 9/1988 | Yamada et al. |
| 4,796,043 | A | 1/1989 | Izumi et al. |
| 4,908,646 | A | 3/1990 | Sato et al. |
| 4,969,045 | A | 11/1990 | Haruki et al. |

(Continued)

FOREIGN PATENT DOCUMENTS

GB      2370438 A      6/2002

(Continued)

OTHER PUBLICATIONS

Patent Abstracts of Japan, publication No. 11-146405, published on May 28, 1999, for Video Signal Processor and Color Video Camera Using the Same.

(Continued)

*Primary Examiner* — Aung S Moe
*Assistant Examiner* — Chia-Wei A Chen
(74) *Attorney, Agent, or Firm* — Andrew V. Smith

(57) ABSTRACT

A method of automatically establishing the correct orientation of an image using facial information. This method is based on the exploitation of the inherent property of image recognition algorithms in general and face detection in particular, where the recognition is based on criteria that is highly orientation sensitive. By applying a detection algorithm to images in various orientations, or alternatively by rotating the classifiers, and comparing the number of successful faces that are detected in each orientation, one may conclude as to the most likely correct orientation. Such method can be implemented as an automated method or a semi automatic method to guide users in viewing, capturing or printing of images.

42 Claims, 8 Drawing Sheets

U.S. PATENT DOCUMENTS

| | | | |
|---|---|---|---|
| 4,970,663 | A | 11/1990 | Bedell et al. |
| 5,051,770 | A | 9/1991 | Cornuejols |
| 5,111,231 | A | 5/1992 | Tokunaga |
| 5,130,935 | A | 7/1992 | Takiguchi |
| 5,137,662 | A | 8/1992 | Hull et al. |
| 5,150,432 | A | 9/1992 | Ueno et al. |
| 5,189,460 | A | 2/1993 | Hayakawa |
| 5,258,803 | A | 11/1993 | Hayakawa |
| 5,305,048 | A | 4/1994 | Suzuki et al. |
| 5,313,245 | A | 5/1994 | Konishi |
| 5,384,615 | A | 1/1995 | Hsieh et al. |
| 5,432,863 | A | 7/1995 | Benati et al. |
| 5,450,504 | A | 9/1995 | Calia |
| 5,485,002 | A | 1/1996 | Kusaka |
| 5,493,409 | A | 2/1996 | Maeda et al. |
| 5,552,853 | A | 9/1996 | Muramatsu et al. |
| 5,764,803 | A | 6/1998 | Jacquin et al. |
| 5,802,220 | A | 9/1998 | Black et al. |
| 5,852,669 | A | 12/1998 | Eleftheriadis et al. |
| 5,875,265 | A | 2/1999 | Kasao |
| 5,926,575 | A * | 7/1999 | Ohzeki et al. ............... 382/243 |
| RE36,280 | E | 8/1999 | Kawabata et al. |
| 5,966,549 | A | 10/1999 | Hara et al. |
| 6,028,960 | A | 2/2000 | Graf et al. |
| 6,035,074 | A | 3/2000 | Fujimoto et al. |
| 6,055,340 | A | 4/2000 | Nagao |
| 6,061,055 | A | 5/2000 | Marks |
| 6,088,040 | A * | 7/2000 | Oda et al. ................... 345/473 |
| 6,134,339 | A | 10/2000 | Luo |
| 6,151,071 | A | 11/2000 | Petilli |
| 6,151,073 | A | 11/2000 | Steinberg et al. |
| 6,252,976 | B1 | 6/2001 | Schildkraut et al. |
| 6,263,113 | B1 | 7/2001 | Abdel-Mottaleb et al. |
| 6,278,491 | B1 | 8/2001 | Wang et al. |
| 6,301,440 | B1 | 10/2001 | Bolle et al. |
| 6,407,777 | B1 | 6/2002 | DeLuca |
| 6,556,704 | B1 | 4/2003 | Chen |
| 6,625,398 | B1 | 9/2003 | Nonaka |
| 6,633,655 | B1 | 10/2003 | Hong et al. |
| 6,636,262 | B1 | 10/2003 | Okajima et al. |
| 6,670,992 | B2 | 12/2003 | Irie |
| 6,678,407 | B1 | 1/2004 | Tajima |
| 6,700,999 | B1 | 3/2004 | Yang |
| 6,714,665 | B1 | 3/2004 | Hanna et al. |
| 6,754,389 | B1 | 6/2004 | Dimitrova et al. |
| 6,760,485 | B1 | 7/2004 | Gilman et al. |
| 6,778,216 | B1 | 8/2004 | Lin |
| 6,798,834 | B1 | 9/2004 | Murakami et al. |
| 6,801,642 | B2 | 10/2004 | Gorday et al. |
| 6,816,611 | B1 | 11/2004 | Hagiwara et al. |
| 6,825,884 | B1 | 11/2004 | Horiuchi |
| 6,829,009 | B2 | 12/2004 | Sugimoto |
| 6,836,554 | B1 * | 12/2004 | Bolle et al. ................ 382/116 |
| 6,885,760 | B2 | 4/2005 | Yamada et al. |
| 6,900,840 | B1 | 5/2005 | Schinner et al. |
| 6,919,892 | B1 * | 7/2005 | Cheiky et al. ............... 345/473 |
| 6,931,147 | B2 * | 8/2005 | Colmenarez et al. ......... 382/118 |
| 6,937,773 | B1 | 8/2005 | Nozawa et al. |
| 6,940,545 | B1 | 9/2005 | Ray et al. |
| 6,947,601 | B2 | 9/2005 | Aoki et al. |
| 6,965,684 | B2 | 11/2005 | Chen et al. |
| 6,977,687 | B1 | 12/2005 | Suh |
| 7,027,619 | B2 | 4/2006 | Pavlidis et al. |
| 7,034,878 | B2 | 4/2006 | Matsushima |
| 7,035,462 | B2 | 4/2006 | White et al. |
| 7,039,222 | B2 | 5/2006 | Simon et al. |
| 7,057,653 | B1 | 6/2006 | Kubo |
| 7,106,366 | B2 | 9/2006 | Parker et al. |
| 7,106,887 | B2 | 9/2006 | Kinjo |
| 7,110,569 | B2 | 9/2006 | Brodsky et al. |
| 7,221,805 | B1 | 5/2007 | Bachelder |
| 7,236,651 | B2 | 6/2007 | Ishitani et al. |
| 7,259,784 | B2 | 8/2007 | Cutler |
| 7,269,292 | B2 | 9/2007 | Steinberg |
| 7,340,111 | B2 | 3/2008 | Ishitani et al. |
| 7,362,354 | B2 | 4/2008 | Lin |
| 7,362,368 | B2 | 4/2008 | Steinberg et al. |
| 7,440,593 | B1 | 10/2008 | Steinberg et al. |
| 7,450,759 | B2 | 11/2008 | Kudoh |
| 7,450,767 | B2 | 11/2008 | Kudoh |
| 7,469,160 | B2 | 12/2008 | Banks et al. |
| 7,508,961 | B2 | 3/2009 | Chen et al. |
| 7,525,688 | B2 | 4/2009 | Matsushima |
| 7,570,883 | B2 | 8/2009 | Sakamoto |
| 7,583,294 | B2 | 9/2009 | Ray et al. |
| 7,616,233 | B2 | 11/2009 | Steinberg et al. |
| 7,620,214 | B2 | 11/2009 | Chen et al. |
| 7,683,964 | B2 | 3/2010 | Okuno |
| 7,715,649 | B2 | 5/2010 | Kameyama |
| 7,822,235 | B2 | 10/2010 | Steinberg et al. |
| 7,859,551 | B2 * | 12/2010 | Bulman et al. ................ 345/630 |
| 7,860,274 | B2 | 12/2010 | Steinberg et al. |
| 7,924,323 | B2 | 4/2011 | Walker et al. |
| 2002/0012454 | A1 * | 1/2002 | Liu et al. ....................... 382/118 |
| 2002/0091326 | A1 | 7/2002 | Hashimoto et al. |
| 2002/0118287 | A1 | 8/2002 | Grosvenor et al. |
| 2002/0172419 | A1 | 11/2002 | Lin et al. |
| 2002/0181801 | A1 | 12/2002 | Needham et al. |
| 2003/0007669 | A1 * | 1/2003 | Martinez ....................... 382/118 |
| 2003/0020974 | A1 | 1/2003 | Matsushima |
| 2003/0023974 | A1 | 1/2003 | Dagtas et al. |
| 2003/0039386 | A1 | 2/2003 | Ishitani et al. |
| 2003/0052985 | A1 | 3/2003 | Oya et al. |
| 2003/0052991 | A1 | 3/2003 | Stavely et al. |
| 2003/0059121 | A1 | 3/2003 | Savakis et al. |
| 2003/0071908 | A1 | 4/2003 | Sannoh et al. |
| 2003/0122942 | A1 | 7/2003 | Parker et al. |
| 2003/0123751 | A1 | 7/2003 | Krishnamurthy et al. |
| 2003/0142209 | A1 | 7/2003 | Yamazaki et al. |
| 2003/0151674 | A1 | 8/2003 | Lin |
| 2003/0152289 | A1 * | 8/2003 | Luo ............................... 382/289 |
| 2003/0169907 | A1 | 9/2003 | Edwards et al. |
| 2003/0179310 | A1 | 9/2003 | Irie |
| 2003/0179445 | A1 | 9/2003 | Maenle et al. |
| 2004/0022435 | A1 | 2/2004 | Ishida |
| 2004/0120399 | A1 | 6/2004 | Kato |
| 2004/0151371 | A1 * | 8/2004 | Chen et al. ..................... 382/165 |
| 2004/0179719 | A1 * | 9/2004 | Chen et al. ..................... 382/118 |
| 2004/0201717 | A1 | 10/2004 | Matsushima |
| 2005/0089218 | A1 | 4/2005 | Chiba |
| 2005/0104848 | A1 | 5/2005 | Yamaguchi et al. |
| 2005/0185054 | A1 | 8/2005 | Edwards et al. |
| 2005/0212955 | A1 | 9/2005 | Craig et al. |
| 2005/0264658 | A1 | 12/2005 | Ray et al. |
| 2006/0008152 | A1 | 1/2006 | Kumar et al. |
| 2006/0008173 | A1 | 1/2006 | Matsugu et al. |
| 2006/0018517 | A1 | 1/2006 | Chen et al. |
| 2006/0050933 | A1 | 3/2006 | Adam et al. |
| 2006/0215924 | A1 | 9/2006 | Steinberg et al. |
| 2008/0002216 | A1 | 1/2008 | Matsushima |
| 2009/0052750 | A1 | 2/2009 | Steinberg et al. |
| 2009/0102949 | A1 | 4/2009 | Steinberg et al. |
| 2011/0075894 | A1 | 3/2011 | Steinberg et al. |

FOREIGN PATENT DOCUMENTS

| | | |
|---|---|---|
| WO | WO2007142621 A1 | 12/2007 |
| WO | WO2008054422 A2 | 5/2008 |
| WO | WO2008054422 A3 | 11/2008 |

OTHER PUBLICATIONS

Patent Abstracts of Japan, publication No. 2002-015311, published on Jan. 18, 2002, for Image Recognizing Device, Shadow Removing Device, Shadow Removing Method, and Storage Medium.

Patent Abstracts of Japan, publication No. 2002-024811, published on Jan. 25, 2002, for Shadow Component Removing Device.

Patent Abstracts of Japan, publication No. 2004-062651, published on Feb. 26, 2004, for Mage Processor, Image Processing Method, Its Recording Medium and Its Program.

Patent Abstracts of Japan, publication No. 2005-316743, published on Nov. 11, 2005, for Image Processing Method and Device.

Patent Abstracts of Japan, publication No. 2006-119817, published on May 11, 2006, for Image Processor.

Patent Abstracts of Japan, publication No. 2006-254415, published on Sep. 21, 2006, for Apparatus, Method, and Program for Creating Luminance Conversion Curve.

Final Office Action mailed Mar. 23, 2010, for U.S. Appl. No. 11/688,236, filed Mar. 19, 2007.
Final Office Action mailed Sep. 22, 2010, for U.S. Appl. No. 11/688,236, filed Mar. 19, 2007.
Non-Final Office Action mailed Aug. 2, 2010, for U.S. Appl. No. 11/688,236, filed Mar. 19, 2007.
Non-Final Office Action mailed Oct. 11, 2011 for U.S. Appl. No. 12/582,642, filed Oct. 20, 2009.
Non-Final Office Action mailed Sep. 8, 2009, for U.S. Appl. No. 11/688,236, filed Mar. 19, 2007.
Non-final Rejection, dated Feb. 8, 2012, for U.S. Appl. No. 12/302,493, filed Nov. 25, 2008.
Non-final Rejection, dated Jan. 27, 2012, for U.S. Appl. No. 12/960,479, filed Dec. 4, 2010.
Non-final Rejection, dated Mar. 29, 2012, for U.S. Appl. No. 12/198,621, filed Aug. 26, 2008.
Non-final Rejection, dated Nov. 3, 2011, for U.S. Appl. No. 12/959,376, filed Dec. 3, 2010.
Non-Final Rejection, dated Oct. 27, 2011, for U.S. Appl. No. 12/892,935, filed Sep. 29, 2010.
Non-Final Rejection, dated Oct. 28, 2011, for U.S. Appl. No. 12/892,937, filed Sep. 29, 2010.
Notice of Allowance, dated Feb. 8, 2012, for U.S. Appl. No. 12/892,935, filed Sep. 29, 2010.
Notice of Allowance, dated Feb. 8, 2012, for U.S. Appl. No. 12/892,937, filed Sep. 29, 2010.
PCT International Preliminary Report on Patentability, for PCT Application No. PCT/US2006/021393, report dated Dec. 3, 2008, 6 pages.
PCT International Preliminary Report on Patentability, for PCT Application No. PCT/US2006/060392, report dated May 5, 2009, 5 pages.
PCT International Search Report and Written Opinion of the International Searching Authority, or the Declaration, for PCT Application No. PCT/US2006/021393, filed Jun. 2, 2006, paper dated Mar. 29, 2007, 12 pgs.
PCT International Search Report and Written Opinion of the International Searching Authority, or the Declaration, for PCT Application No. PCT/US2006/060392, filed Oct. 31, 2006, paper dated Sep. 19, 2008, 9 pgs.
Endo, M., "Perception of upside-down faces: and analysis form the viewpoint of cue saliency", in Ellis, H. Jeeves, M., Newcombe, F,. and Young, A., editors, Aspects of Face Processing, 53-58, 1986, Matnus Nijhoff Publishers.
Baluja, Shumeet: "Face Detection with In-Plane rotation: Early Concepts and Preliminary Results", Technical Report JPRC-TR-97-001.
Ming-Hsuan Yang, David J. Kriegman, Naarendra Ahuja: Detecting Faces in Images: A Survey. IEEE Transactions on Pattern Analysis and Machine Intelligence, vol. 24, No. 1, pp. 34-58 (Jan. 2002).
Yael Moses, Shimon Ullman, Shimon Edelman: "Generalization to Novel Images in Upright and Inverted Faces", Department of Applied Mathematics and Computer Science, The Weizmann Institute of Science, Rehovot 76100, Israel, Nov. 29, 1994.
Paul Viola, Michael Jones: "Robust Real Time Object Detection",2nd international workshop on Statistical and Computational theories of Vision—Modeling, Learning, Computing, and Sampling. Vancouver, Canada, Jul. 31, 2001. 25 pages.
Anlauf, J. K. and Biehl, M.: "The adatron: and adaptive perception algorithm". Neurophysics Letters, 10:687-692, 1989.
Le Saux, Bertrand and Amato, Giuseppe: "Image Classifiers for Scene Analysis", International Conference on Computer Vision and Graphics (ICCVG'04), Warsaw, Poland, Sep. 2004.
Henry A. Rowley, Shumeet Baluja, and Takeo Kanade, "Neural Network-Based Face Detection," IEEE Transactions on Pattern Analysis and Machine Intelligence, vol. 20, No. 1, pp. 23-28, Jan. 1998.

* cited by examiner

DETECTING ORIENTATION OF DIGITAL IMAGES USING FACE DETECTION INFORMATION

PRIORITY

This application is a Continuation of U.S. patent application Ser. No. 12/482,305, filed Jun. 10, 2009, now U.S. Pat. No. 7,844,135, which is a Continuation of U.S. patent application Ser. No. 11/024,046, filed Dec. 27, 2004, now U.S. Pat. No. 7,565,030, which is a Continuation-in-Part of U.S. patent application Ser. No. 10/608,772, filed Jun. 26, 2003, now U.S. Pat. No. 7,440,593, which are hereby incorporated by reference.

BACKGROUND

1. Field of the Invention

The invention relates to automatic suggesting or processing of enhancements of a digital image using information gained from identifying and analyzing faces appearing within the image, and in particular method of detection the image orientation using face detection. The invention provides automated orientation detection for photographs taken and/or images detected, acquired or captured in digital form or converted to digital form, by using information about the faces in the photographs and/or images.

2. Description of the Related Art

Viola and Jones in the paper entitled "Robust Real Time Object Detection" as presented in the $2^{nd}$ international workshop on Statistical and Computational theories of Vision, in Vancouver, Canada, Jul. 31, 2001, describe a visual object detection framework that is capable of processing images extremely rapidly while achieving high detection rates. The paper demonstrates this framework by the task of face detection. The technique is based on a learning technique where a small number of critical visual features yield a set of classifiers.

Yang et al., IEEE Transactions on Pattern Analysis and Machine Intelligence, Vol. 24, No. 1, pages 34-58, give a useful and comprehensive review of face detection techniques January 2002. These authors discuss various methods of face detection which may be divided into four main categories: (i) knowledge-based methods; (ii) feature-invariant approaches, including the identification of facial features, texture and skin color; (iii) template matching methods, both fixed and deformable and (iv) appearance based methods, including eigenface techniques, statistical distribution based methods and neural network approaches. They also discuss a number of the main applications for face detections technology. It is recognized in the present invention that none of the prior art describes or suggests using detection and knowledge of faces in images to create and/or use tools for the enhancement or correction of the images according to the invention as set forth in the claims below, nor as described in detail below as preferred and alternative embodiments.

Blluja, 1997 describes methods of extending the upright, frontal template based face detection system to efficiently handle all in plane rotations, this achieving a rotation invariant face detection system.

a. Faces as Subject Matter

It is well known that human faces are the most photographed subject matter for the amateur and professional photographer. Thus it is possible to assume a high starting percentage for algorithms based on the existence of faces in them.

b. Orientation

The camera is usually held horizontally or vertically, in counter clockwise or clockwise in relations to the horizontal position when the picture is taken, creating what is referred to as a landscape mode or portrait mode, respectively. Thus most images are taken in either one of the three orientations, namely landscape, clockwise portrait and counterclockwise portrait. When viewing images, it is preferable to determine ahead of time the orientation of the camera at acquisition, thus eliminating a step of rotating the image and automatically orienting the image. The system may try to determine if the image was shot horizontally, which is also referred to as landscape format, where the width is larger than the height of an image, or vertically, also referred to as portrait mode, where the height of the image is larger than the width. Techniques may be used to determine an orientation of an image. Primarily these techniques include either recording the camera orientation at an acquisition time using an in camera mechanical indicator or attempting to analyze image content post-acquisition. In-camera methods, although providing precision, use additional hardware and sometimes movable hardware components which can increase the price of the camera and add a potential maintenance challenge. However, post-acquisition analysis may not generally provide sufficient precision. Knowledge of location, size and orientation of faces in a photograph, a computerized system can offer powerful automatic tools to enhance and correct such images or to provide options for enhancing and correcting images.

c. Face Recognition as a Function of Orientation

It is a well known fact for one familiar in the art of face recognition that the human visual system is very sensitive to the orientation of the faces. As a matter of fact, experiments indicated that the way the human mind stores faces is different for upright and inverted faces, as described in Endo, 1982. In particular, recognition of inverted faces is known to be a difficult perceptual task. While the human visual system performs well in recognizing different faces, performing the same task with inverted faces is significantly worse. Such results are illustrated for example in Moses, 1994, where face memory and face recognition is determined to be highly orientation dependent. A detailed review of face recognition of inverted faces is available in Valentine, 1988.

It is therefore only natural that artificial intelligence detection algorithms based on face related classifiers may have the same features of being orientation variant.

d. Image Classifiers for Scene Analysis:

SUMMARY OF THE INVENTION

Even though human beings have no problem to interpret images semantically, the challenge to do so using artificial intelligence is not that straight forward. A few methods are available to those familiar in the art of image and pattern recognition that separate images using a learning based descriptor space. Such methods are using a training set and a maximization methods of likelihood. Examples of such methods includes the Adatron (1989) method as described by Analauf et. al incorporated herein by reference. Other work includes scene analysis such as the work by Le Saux Bertrand et al (2004).

In view of the above, a method of analyzing and processing a digital image using the results of face detection algorithms within said image to determine the correct orientation of the image is provided.

A face detection algorithm with classifiers that are orientation sensitive, or otherwise referred to as rotation variant, is applied to an image, or a subsampled resolution of an image.

The image is then rotated, or the classifiers are rotated, and the search is repeated for the orientations that are under question. Based on the results of the detection, the image with the highest amount of faces detected, and or the orientation with the highest face detection confidence level, is the one estimated to be the correct orientation of the image.

The digital image may be digitally-acquired and/or may be digitally-captured. Decisions for processing the digital image based on said face detection, selecting one or more parameters and/or for adjusting values of one or more parameters within the digital image may be automatically, semi-automatically or manually performed.

Values of orientation may be adjusted arbitrarily or in known intervals, e.g., of 90 degrees, such that a rotation value for the digital image may be determined.

The method may be performed within a digital acquisition device or an external device or a combination thereof. Rotation can also be applied as part of the transfer process between devices.

The face pixels may be identified, a false indication of another face within the image may be removed. The face pixels identifying may be automatically performed by an image processing apparatus, and a manual verification of a correct detection of at least one face within the image may be provided.

A method is further provided for detecting an orientation of a digital image using statistical classifier techniques. A set of classifiers are applied to a digital image in a first orientation and a first level of match between the digital image at the first orientation and the classifiers is determined. The digital image is rotated to a second orientation, and the classifiers are applied to the rotated digital image at the second orientation. A second level of match is determined between the rotated digital image at the second orientation and the classifiers. The first and second levels of match are compared. It is determined which of the first orientation and the second orientations has a greater probability of being a correct orientation based on which of the first and second levels of match, respectively, comprises a higher level of match.

The method may further include rotating the digital image to a third orientation, applying the classifiers to the rotated digital image at the third orientation, and determining a third level of match between the rotated digital image at the third orientation and the classifiers. The third level of match is compared with the first level of match or the second level of match, or both. It is determined which of two or more of the first orientation, the second orientation and the third orientation has a greater probability of being a correct orientation based on which of the corresponding levels of match is greater.

A method is also provided for detecting an orientation of a digital image using statistical classifier techniques. The method includes applying a set of classifiers to a digital image in a first orientation and determining a first level of match between the digital image at the first orientation and the classifiers. The set of classifiers is rotated a first predetermined amount, the classifiers rotated the first amount are applied to the digital image at the first orientation. A second level of match is determined between the digital image at the first orientation and the classifiers rotated the first amount. The first and second levels of match are compared, and it is determined which of the first and second levels of match is greater in order to determine whether the first orientation is a correct orientation of the digital image. A rotation of the classifiers by a second amount my be performed and the method performed with three relatively rotated sets of classifiers, and so on.

One or more processor readable storage devices are also provided having processor readable code embodied thereon. The processor readable code programs one or more processors to perform any of the methods for detecting an orientation of a digital image using statistical classifier techniques briefly summarized above.

INCORPORATION BY REFERENCE

Figure 1A:
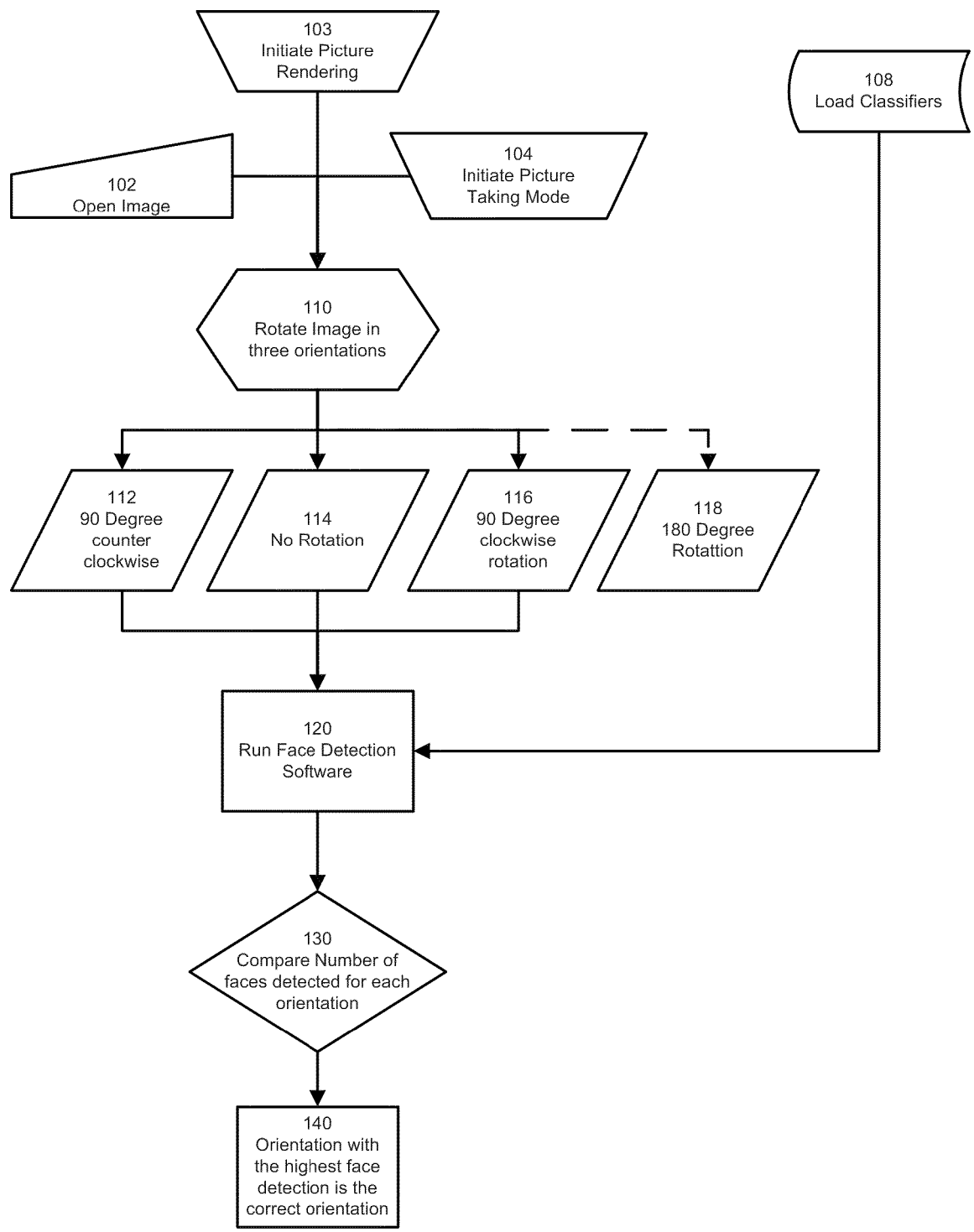
FIG. 1a is a flow diagram that illustrates a main orientation workflow based on rotation of a digital image that includes one or more faces.

What follows is a cite list of references each of which is, in addition to those references otherwise cited in this application, and that which is described as background, the invention summary, the abstract, the brief description of the drawings and the drawings themselves, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description herein:

U.S. Pat. Nos. RE33,682, RE31,370, U.S. Pat. Nos. 4,047,187, 4,317,991, 4,367,027, 4,638,364, 5,291,234, 5,488,429, 5,638,136, 5,710,833, 5,724,456, 5,781,650, 5,812,193, 5,818,975, 5,835,616, 5,870,138, 5,900,909, 5,978,519, 5,991,456, 6,097,470, 6,101,271, 6,128,397, 6,148,092, 6,151,073, 6,188,777, 6,192,149, 6,249,315, 6,263,113, 6,268,939, 6,282,317, 6,301,370, 6,332,033, 6,393,148, 6,404,900, 6,407,777, 6,421,468, 6,438,264, 6,456,732, 6,459,436, 6,473,199, 6,501,857, 6,504,942, 6,504,951, 6,516,154, and 6,526,161; United States published patent applications nos. 2004/40013304, 2004/0223063, 2004/0013286. 2003/0071908, 2003/0052991, 2003/0025812, 2002/20102024, 2002/0172419, 2002/0114535, 2002/0105662, and 2001/0031142;

Japanese patent application no. JP5260360A2;

British patent application no. GB0031423.7; and

Anlauf, J. K. and Biehl, M.: "The adatron: and adaptive perception algorithm". Neurophysics Letters, 10:687-692, 1989.

Baluja & Rowley, "Neural Network-Based Face Detection," IEEE Transactions on Pattern Analysis and Machine Intelligence, Vol. 20, No. 1, pages 23-28, January 1998

Baluja, Shumeet in "Face Detection with In-Plane rotation: Early Concepts and Preliminary Results", Technical Report JPRC-TR-97-001

Endo, M., "Perception of upside-down faces: and analysis form the viewpoint of cue saliency", in Ellis, H. Jeeves, M., Newcombe, F,. and Young, A., editors, Aspects of Face Processing, 53-58, 1986, Manus Nijhoff Publishers Moses, Yael and Ullman, Shimon and Shimon Edelman in "Generalization to Novel Images in Upright and Inverted Faces", 1994.

Le Saux, Bertrand and Amato, Giuseppe: "Image Classifiers for Scene Analysis", International Conference on Computer Vision and Graphics (ICCVG'04), Warsaw, Poland, September 2004

Valentine, T., Upside Down Faces: A review of the effect of inversion and encoding activity upon face recognition", 1988, Acta Psychologica, 61:259-273.

Viola and Jones "Robust Real Time Object Detection", $2^{nd}$ international workshop on Statistical and Computational theories of Vision, in Vancouver, Canada, Jul. 31, 2001, Yang et al., IEEE Transactions on Pattern Analysis and Machine Intelligence, Vol. 24, no. 1, pp 34-58 (January 2002).

Illustrative Definitions

"Face Detection" involves the art of detecting faces in a digital image. One or more faces may be first isolated and/or identified within a larger digital image prior to further processing based at least in part on the detection of the faces. Face detection includes a process of determining whether a human face is present in an input image, and may include or is preferably used in combination with determining a position and/or other features, properties, parameters or values of parameters of the face within the input image;

"Image-enhancement" or "image correction" involves the art of modifying a digital image to improve its quality or according to another selected manual or automatic input criteria. A "global" modification is one that is applied to an entire image or substantially the entire image, while a "selective" modification is applied differently to different portions of the image or to only a selected portion of the image.

A "pixel" is a picture element or a basic unit of the composition of a digital image or any of the small discrete elements that together constitute an image;

A "digitally-captured image" includes an image that is digitally located and held in a detector, preferably of a portable digital camera or other digital image acquisition device.

A "digitally-acquired image" includes an image that is digitally recorded in a permanent file and/or preserved in a more or less permanent digital form.

"A digitally-detected image" is an image comprising digitally detected electromagnetic waves.

"Classifiers" are generally reference parameters selectively or automatically correlated or calibrated to some framework or absolute reference criteria. For example, one or more orientation classifiers in a 2-dimensional image may be configured according to a proper and/or selected orientation of a detected face within a digital image. Such classifiers may be calibrated or correlated with a detected facial orientation such that an overall digital image containing a face may be oriented according to these calibrated or correlated classifiers.

Classifiers may be statistical or absolute: Statistical classifiers assign a class $\omega_i$ so that given a pattern $\hat{y}$, the most probable $P(\omega_i|\hat{y})$ is the largest. In many cases, it is not desired to actually calculate $P(\omega_i|\hat{y})$, but rather to find (i) so that $\omega_i$ will provide the largest $P(\omega_i|\hat{y})$. The accuracy of a statistical classifier generally depends on the quality of training data and of the algorithm used for classification. The selected populations of pixels used for training should be statistically significant. This means that a minimum number of observations are generally required to characterize a particular site to some selected or acceptable threshold level of error.

Figure 2A:
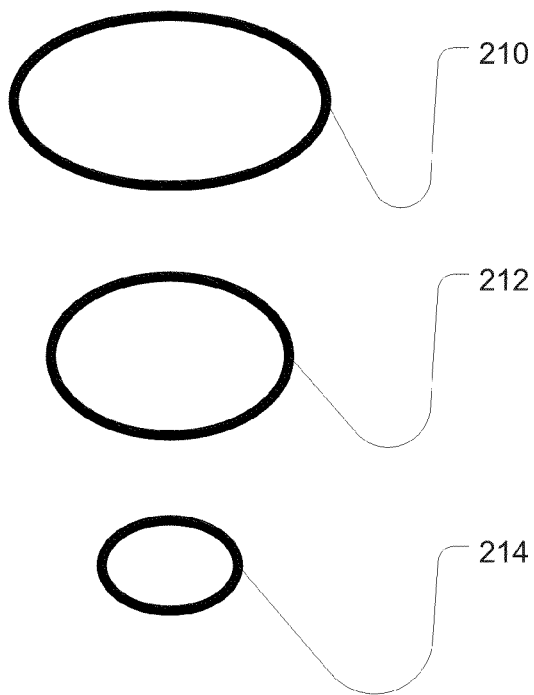
FIG. 2a illustrates an ellipse-based orientation classifier that may be used in a process in accordance with a preferred embodiment.
Figure 2B:
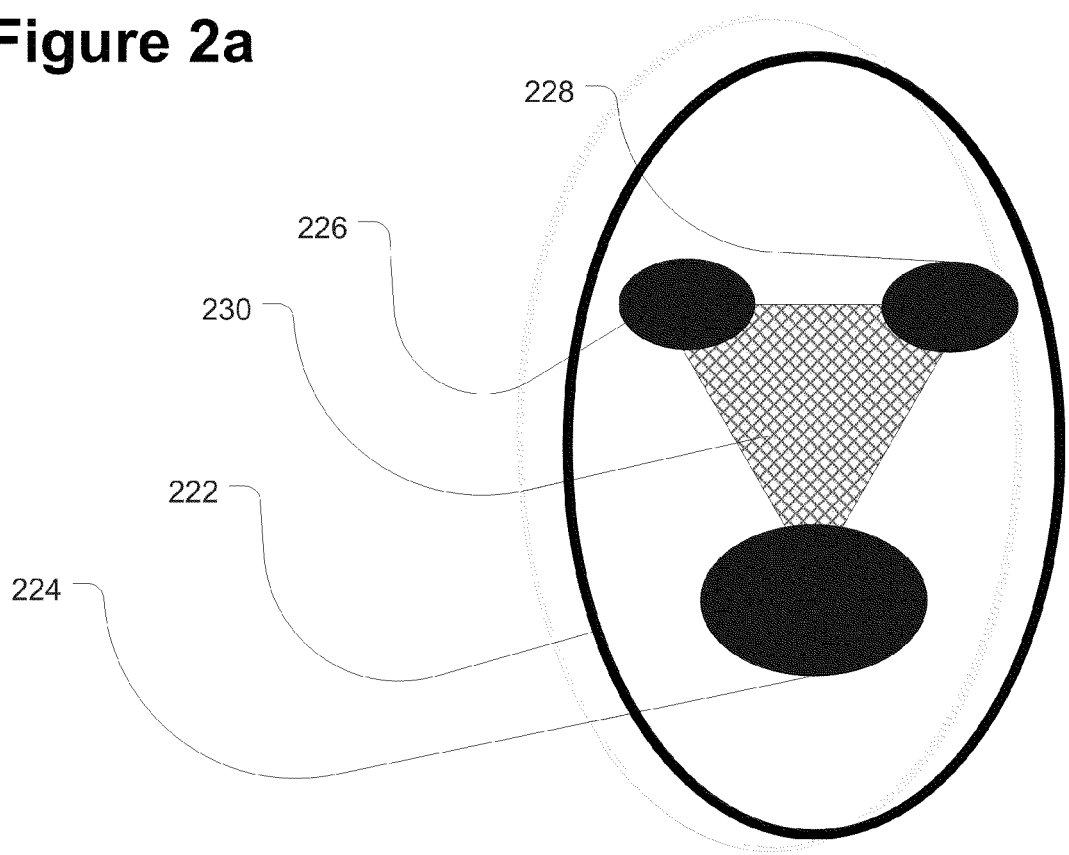
FIG. 2b illustrates an ellipse-based classifier system applied to a facial image.

FIG. 2a and FIG. 2b illustrate in a graphical form non-exhaustive examples of classifiers. Objects 210, 212, and 214 in FIG. 2a represent a simple ellipse classifier, in varying sizes. FIG. 2b illustrates a complex classifier of a face, which is made of simpler classifiers. In this case, the mouth, 224 and the eyes 226, 228 correspond to ellipse classifiers 210 and 214 as defined in FIG. 2a.

The classifiers may not necessarily be only of certain shape. More complex classifiers can be of a more abstract physical nature. Alternatively, a classifier can be of color data. For example, a color classifier may be a classifier with higher content of blue towards the top and higher content of green or brown towards the bottom.

An "image orientation" is a rotational position of an image relative to a selected or permanent coordinate or coordinate system that may itself be determined relative to an absolute spatial system, such as the earth, or a system determined or selected within a frame of a digital image. Generally herein, an image orientation is identified relative to an orientation of one or more classifiers, such as the elliptical classifiers illustrated at 2a-2b, 3b and 4a-4b.

Figure 3A:
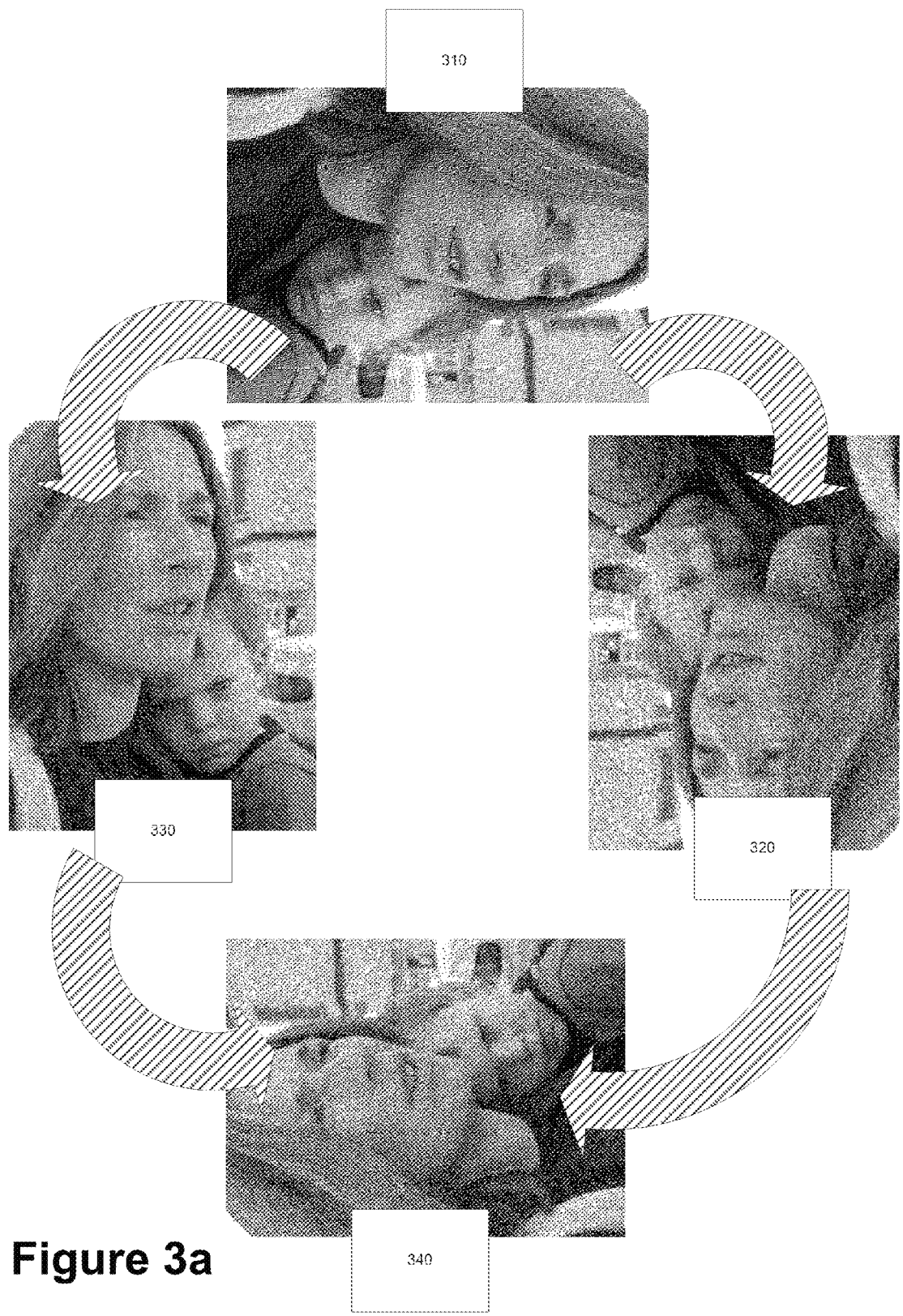
FIG. 3a illustrates four different potential orientations of a single image.

As another example, an image orientation may identified relative to a horizontal/vertical system, such as illustrated in FIG. 3a. The image 310 may be rotated relative to this coordinate system or to an orientation of one or more elliptical classifiers by 90° counter clockwise 320 or clock wise 330. A fourth orientation 340 is a 180° degree rotation which is also illustrated in FIG. 3a. For most practical reasons, a 180 degree orientation is typically not a desired or viable situation for hand held pictures. However, technically and theoretically, the up-side-down orientation can be included in the algorithm Rotational positions may be defined relative to absolute or image-based coordinates, and rotations of the image and/or of the classifiers may be of arbitrary angular extent, e.g., 1° or finer, 5°, 10°, 15°, 30°, 45°, or others, may be selected in accordance with embodiments of the invention.

Figure 3B:
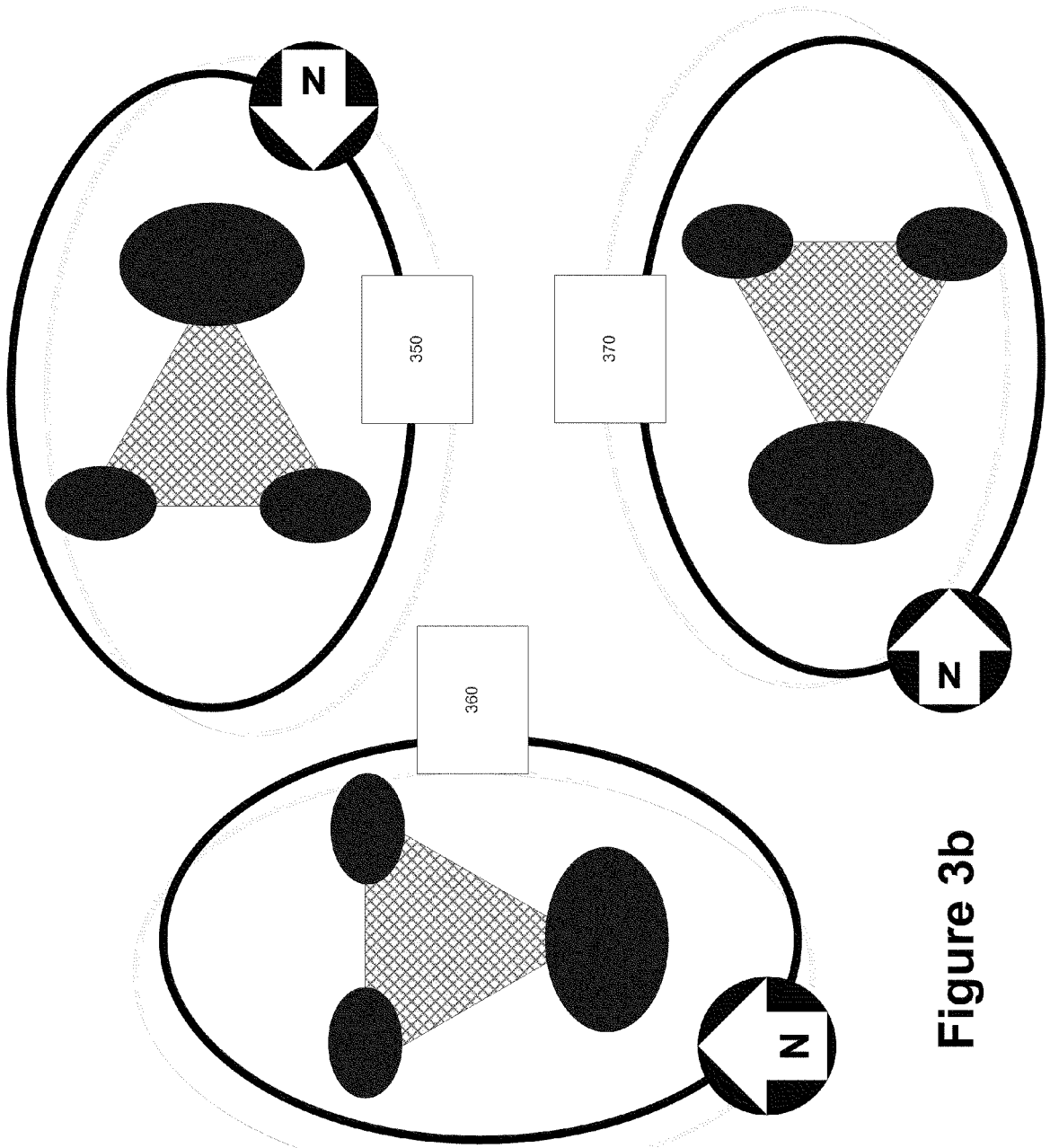
FIG. 3b illustrates different orientations of classifiers applied to a same image.

Classifier orientation is illustrated in FIG. 3b. The classifiers of FIG. 3b are oriented in three orientations corresponding to the image orientations shown. Object 360 represents a "correctly" oriented image, as selected or built-in to the digital system, block 350 represents a counter clockwise orientation, and block 370 represents a clockwise orientation. A "correct" orientation may be determined based on a combined level of match of multiple classifiers and/or on relative positions of the classifiers once matched to their respective facial regions. These regions may include the two eyes and mouth of a detected face, and may also include an outline of a person's head or entire face. The arrow labeled "N" in the example of FIG. 3b points in a direction that is selected or determined to be the "correct" vertical axis of the image. The orientations illustrated at FIG. 3b correspond to illustrative images 310, 320 and 330 in FIG. 3a.

Figure 4A:
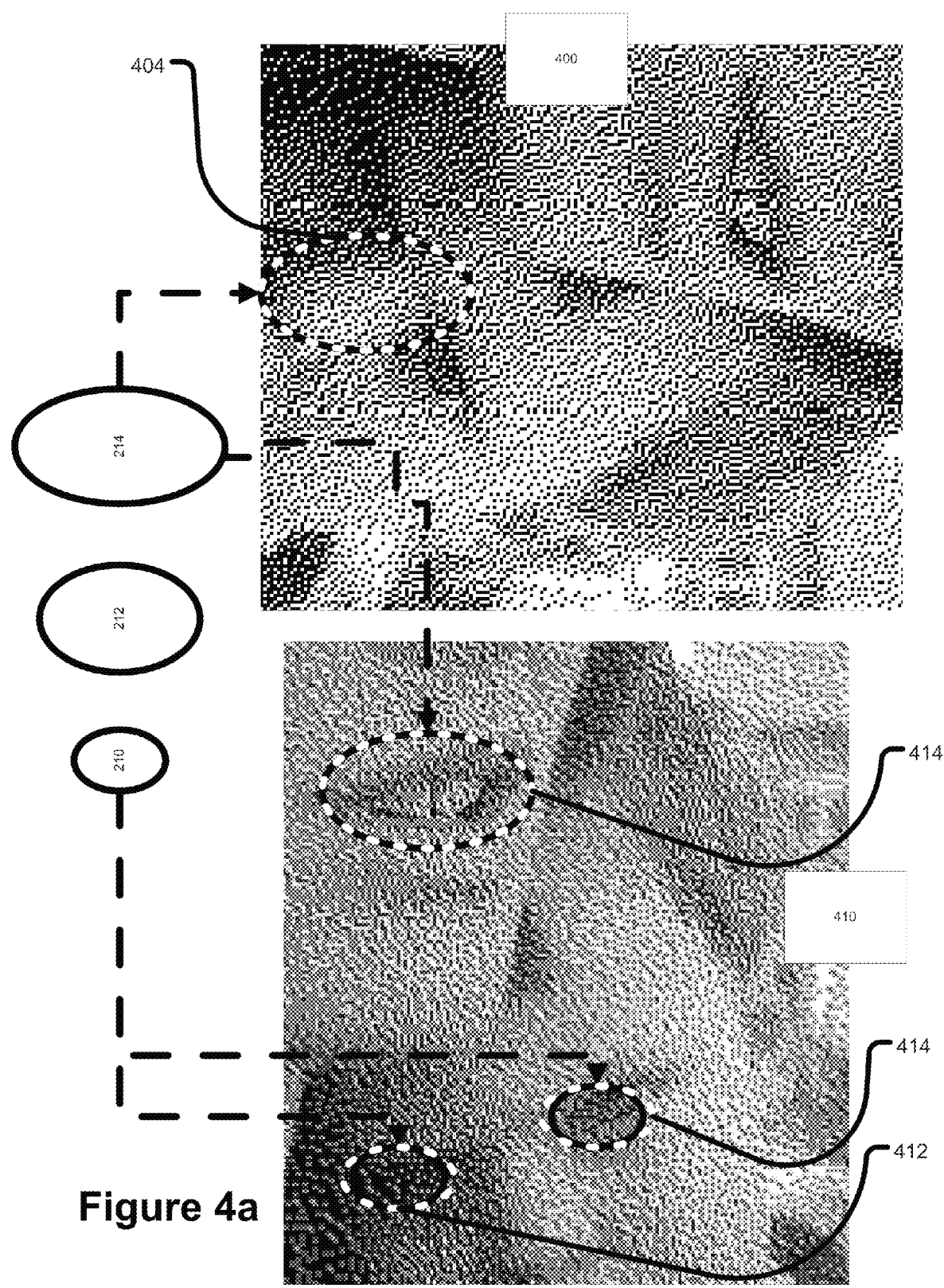
FIG. 4a illustrates a matching of ellipse-based classifiers within images.
Figure 4B:
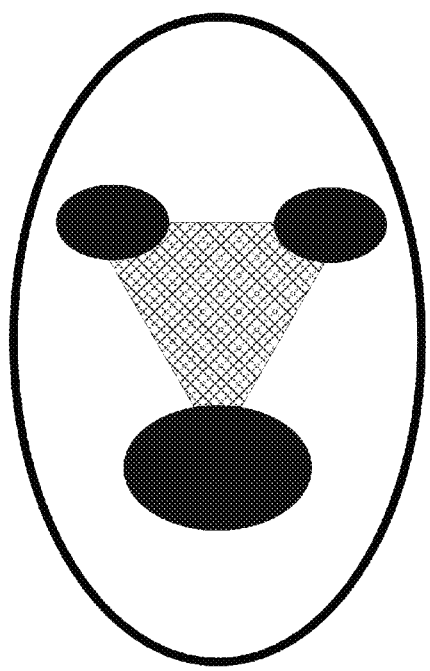
FIG. 4b illustrates a matching of complex classifiers with an image.
Figure 4B:
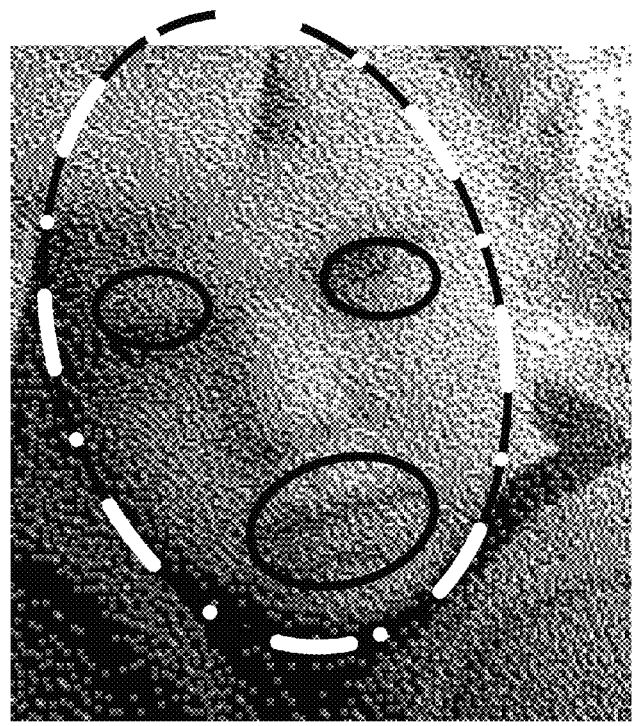
Figure 4B:

"Matching image classifiers to images" involves correlating or assigning classifier constructs to actual digital images or portions or sub-samplings of digital images. Such matching is illustrated at FIGS. 4a and 4b. According to FIG. 4a different sized ellipses, as already described as being examples of classifiers, e.g., ellipses 210, 212 and 214 of FIG. 2a, are matched to various objects, e.g., eyes and mouth regions, in facial images. The matching is preferably performed for different image and/or facial region orientations, e.g., 400 and 410 of FIG. 4*a*, to determine a correct or selected orientation of the digital image.

A correctly oriented ellipse may, however, match different objects in two orientations of an image or may match different objects than desired in images regardless of orientation. Referring to FIG. 4*a*, e.g., ellipse 214 matches correctly the lips 414 in image 410 but also the nose bridge 404 when the image is "incorrectly" oriented or not in the desired orientation. The smaller ellipse 410 matches both instances of eyes 412 and 413 in the correctly oriented image 410. This example illustrates an instance wherein it is not sufficient to use a single classifier, as there may be cases of false detection. This illustrates an advantage of the process of determining the orientation of faces based on statistical classifiers in accordance with a preferred embodiment of the present invention.

Concatenation is generally used herein to describe a technique wherein classifiers, objects, axes, or parameters are connected, linked, correlated, matched, compared or otherwise related according to a selected or built-in set of criteria, and/or to describe sequential performance of operation or processes in methods in accordance with embodiments of the invention. For example, an image may be determined to be properly aligned when axes of a pair of eye ellipses are determined to be collinear or the image is oriented or re-oriented such that they are made to be collinear, or when an image and/or classifiers are rotated to cause the foci of eye ellipses to form an isosceles triangle with a center of a mouth ellipse, etc.

DETAILED DESCRIPTION OF THE PREFERRED EMBODIMENTS

Preferred embodiments are described below including methods and devices for providing or suggesting options for determining image orientation automatically using face detection. A preferred embodiment includes an image processing application whether implemented in software or in firmware, as part of the image capture process, such as in a digital camera, or as part of post processing, such as a desktop, in the camera as a post processing background process or on a server application. This system receives images in digital form, where the images can be translated into a grid representation including multiple pixels.

The preferred embodiment describes a method of re-using face detection information in different orientations of the image to determine the orientation with the highest probability to be the correct one. The information regarding the location and size of faces in an image assist in determining correct orientation.

Advantages of the preferred embodiments include the ability to automatically perform or suggest or assist in the determination of the correct orientation of an image. Another advantage is that the processing may be automatically performed and/or suggested based on this information. Such automatic processing is fast enough and efficient enough to handle multiple images in close to real time, or be used for a single image as part of the image processing in the acquisition device. Many advantageous techniques are provided in accordance with preferred and alternative embodiments set forth herein. For example, this method of detection the image orientation can be combined with other methods of face detection, thus improving the functionality, and re-purposing the process for future applications.

Two or more methods of detecting faces in different orientations may be combined to achieve better accuracy and parameters of a single algorithm may be concatenated into a single parameter. The digital image may be transformed to speed up the process, such as subsampling or reducing the color depth. The digital image may be transformed to enhance the accuracy such as preprocessing stage for improving the color balance, exposure or sharpness. The digital image may post processed to enhance the accuracy such as removal of false positives as a post processing process, based on parameters and criteria outside of the face detection algorithm. Values of orientation may be adjusted such that a rotation value for the digital image is determined. This technique may be implemented for supporting arbitrary rotation or fixed interval rotation such as 90 degree rotation.

The method may be performed within any digital image capture device, which as, but not limited to digital still camera, phone handset with built in camera, web camera or digital video camera. Determining which of the sub-group of pixels belong to which of the group of face pixels may be performed. The determining of the initial values of one or more parameters of pixels may be calculated based on the spatial orientation of the one or more sub-groups that correspond to one or more facial features. The spatial orientation of the one or more sub-groups that correspond to one or more facial features may be calculated based on an axis of an ellipse fit to the sub-group. The adjusted values of pixels within the digital image may be rounded to a closest multiple of 90 degrees. The initial values may be adjusted to adjusted values for re-orienting the image to an adjusted orientation. The one or more facial features may include an eye, two eyes, two eyes and a mouth, an eye, a mouth, hairline, ears, nostrils, nose bridge, eyebrows or a nose, or combinations thereof. On a more abstract level the features used for the detection of objects in general in the image, or faces specifically may be determined through a mathematical classifiers that are either deduced via a learning process or inserted into the system. One example of such classifiers are described by Viola Jones in the paper incorporated herein by reference. Other classifiers can be the eigenfaces, which are the basis functions that define images with faces.

Each of the methods provided are preferably implemented within software and/or firmware either in the camera or with external processing equipment. The software may also be downloaded into the camera or image processing equipment. In this sense, one or more processor readable storage devices having processor readable code embodied thereon are provided. The processor readable code programs one or more processors to perform any of the above or below described methods.

FIG. 1*a* illustrates a process flow according to a preferred embodiment. The input is an image which can come from various sources. According to this exemplary procedure, an image may be opened by a software, firmware or other program application in block 102. The process may be initiated when a photographer takes a picture at block 103, or as an automatic background process for an application or acquisition device at block 104.

The classifiers are preferably pre-determined for the specific image classification. A detailed description of the learning process to create the appropriate classifiers can be found in the paper by Viola and Jones that has been cited and incorporated by reference hereinabove. The classifiers are loaded, at step 108, into the application.

The image is preferably rotated into three orientations at block 110. Only two or more than three orientation may alternatively be used: The preferred orientations are counter clockwise 112, no rotation 114 and clockwise, 116. Note that a fourth orientation which is the upside down 118 is technically and theoretically plausible but is not preferred due to the statistical improbability of such images. One or more images rotated by 1°, or a few seconds or minutes, or by 3° or 45°, or an arbitrary amount, may also be used.

The three images are then provided to the face detection software at block 120 and the results are analyzed at block 130. The image with the highest probability of detection of faces is determined at block 140 to be most likely the one with the right orientation.

Figure 1B:
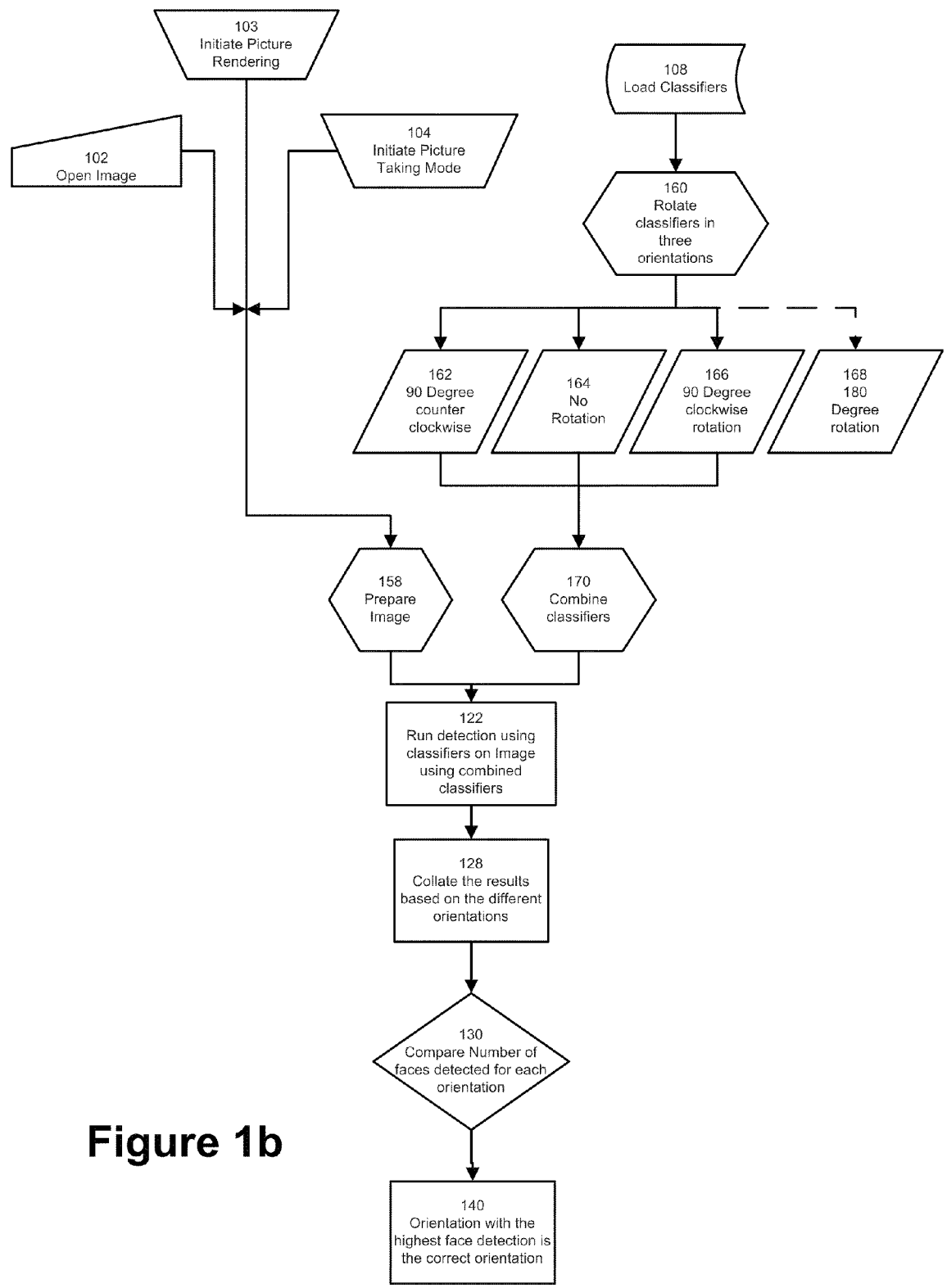
FIG. 1b is a flow diagram that illustrates a main orientation workflow based on rotation of classifiers relative to an orientation of a digital image that includes one or more faces.

FIG. 1b is an alternative embodiment, wherein the classifiers are rotated as opposed to the images. By doing so, even if the results are similar, the execution time is highly optimized because the process is preferably not repeated over three images, and is instead performed over only a single image with two, three or more times the number of classifiers. Preferably, two sets of rotated classifiers are used along with an unrotated set. According to FIG. 1b, the classifiers loaded at block 108 are rotated at block 160 to create counter clockwise classifiers 162, original classifiers 164 and clockwise classifiers 166. As explained above, if desired, a fourth set of classifiers 168 of 180 degree rotation can be generated, and in fact, any number of classifier sets may be generated according to rotations of arbitrary or selected amounts in accordance with alternative embodiments of this invention. In a third embodiment, both the image and the classifiers may be rotated.

The classifiers are preferably combined into a single set of classifiers at block 170. The concatenation of the classifiers is preferably performed in such a manner that an false eliminating process would still be optimized. Note that these operations need not be executed at the time of analysis, but can be prepared prior to running the process on an image, as a preparatory step. Also note that the two approaches may be combined, where some classifiers may or may not be used depending on the results of the previous classifies. It may be possible to merge the preferred three sets, or an arbitrary number of two or more sets, of rotated classifiers.

Part-way through, the common classifiers one would branch into the specific classifiers for each orientation. This would speed up the algorithm because the first part of the classification would be common to the three orientations.

In another embodiment, where the classifier set contains rotation invariant classifiers it is possible to reduce the number of classifiers which must be applied to an image from 3N to 3N−2M where N is the number of classifiers in the original classifier set and M is the number of rotation invariant classifiers. The image is then prepared at block 158 to run the face detection algorithm at block 122. Such preparation varies on the algorithm and can include different operations such as converting the image format, the color depth, the pixel representation etc. In some cases the image is converted, such as described by Viola and Jones, to form a pixel based representation from an integral one. In other cases the image may be subsampled to reduce computation, converted to a gray scale representation, or various image enhancement algorithms such as edge enhancement, sharpening, blurring, noise reduction etc. may be applied to the image. Numerous operations on the image in preparation may also be concatenated. The face detection algorithm is run once on the image at block 122, using the multiple set of classifiers 170. The results are then collated at block 128, according to each of the three orientations of the preferred classifier set. The number of surviving face regions for each orientation of the classifier set are next compared at block 130. The orientation with the highest number of surviving face regions is determined at block 140- to be the one with the highest likelihood orientation.

In an additional embodiment, the algorithm handles may handle cases of false detection of faces. The problem occurs where in some cases regions that are not faces are marked as potential faces. In such cases, it is not enough to count the occurrence of faces, but the probability of false detection and missed faces needs to be accounted for.

Figure 1C:
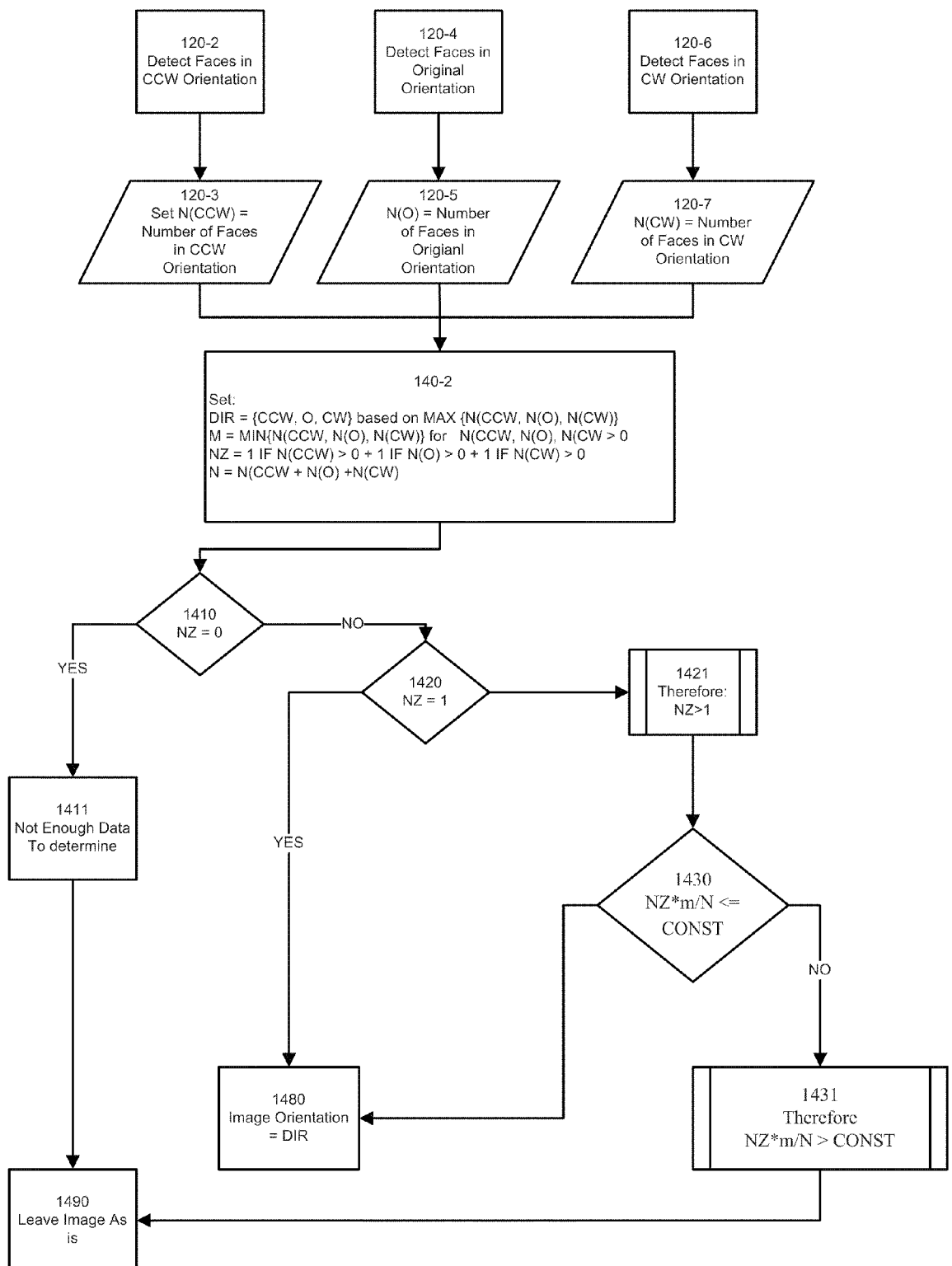
FIG. 1c describes an exemplary implementation of the process illustrated at FIG. 1a and/or FIG. 1b.

Such algorithm which is an expansion of Block 140 of FIGS. 1a and 1b is described with reference to the flow diagram illustrated at FIG. 1c:

Some representations used in the algorithm include the following:

DIR: the most populated direction and the maximal number of detected faces on any direction (DIR is on of CCW, O, CW).

M: the minimal non-zero number of detected faces on any direction (m).

NZ: the number of populated directions (directions for which we have detection).

N: the total number of detected faces.

CONST: probability factor, which is based on empirical results can be from 0.6 to 0.9.

An exemplary orientation decision may be determined as follows:

1410 NZ==0, no faces are found in the image, image orientation is, 1490 DEFAULT (keep image as it is)

1420 NZ==1 there is as single face in the image, image orientation is DIR

1421 If NZ>1

1430 if NZ*m/N<=CONST there are multiple faces, multiple orientations with a predominant orientation, image orientation is Dir Therefore 1431 NZ*m/N>CONST there are multiple faces, multiple orientations without a predominant orientation, image orientation is, 1490 DEFAULT (no decision can be taken). (keep image as it is)

Automatic Orientation detection and in particular orientation detection using faces, particularly for digital image processing applications according to preferred and alternative embodiments set forth herein, are further advantageous in accordance with various modifications of the systems and methods of the above description as may be understood by those skilled in the art, as set forth in the references cited and incorporated by reference herein and as may be otherwise described below.

For example, an apparatus according to another embodiment may be provided for detection and recognition of specific features in an image using an eigenvector approach to face detection (see, e.g., U.S. Pat. No. 5,710,833 to Moghaddam et al., incorporated by reference). Additional eigenvectors may be used in addition to or alternatively to the principal eigenvector components, e.g., all eigenvectors may be used. The use of all eigenvectors may be intended to increase the accuracy of the apparatus to detect complex multi-featured objects. Such eigenvectors are orientation sensitive, a feature that can be utilized according to this invention.

Faces may be detected in complex visual scenes and/or in a neural network based face detection system, particularly for digital image processing in accordance with preferred or alternative embodiments herein (see, e.g., U.S. Pat. No. 6,128,397 to Baluja & Rowley; and "Neural Network-Based Face Detection," IEEE Transactions on Pattern Analysis and Machine Intelligence, Vol. 20, No. 1, pages 23-28, January 1998 by the same authors, each reference being hereby incorporated by reference. An image may be rotated prior to the application of the neural network analysis in order to optimize the success rate of the neural-network based detection (see, e.g., U.S. Pat. No. 6,128,397, incorporated by reference). This technique is particularly advantageous when faces are oriented vertically. Face detection in accordance with preferred and alternative embodiments, and which are particularly advantageous when a complex background is involved, may use one or more of skin color detection, spanning tree minimization and/or heuristic elimination of false positives (see, e.g., U.S. Pat. No. 6,263,113 to Abdel-Mottaleb et al., incorporated by reference). Alternatively, according to this invention, the neural-network classifiers may be rotated, to determine the match based the image orientation, as described by this invention.

In the context of automatic image rotation, and determining image orientation, an embodiment including electrical, software and/or firmware components that detect blue sky within images may be included (see, e.g., U.S. Pat. No. 6,504,951 to Luo et al., incorporated by reference) This feature allows image orientation to be determined once the blue-sky region(s) are located and analyzed in an image. In accordance with an alternative embodiment, other image aspects are also used in combination with blue sky detection and analysis, and in particular the existence of facial regions in the image, to determine the correct orientation of an image. In accordance with this invention, such filters, including color based filters with specific orientation characteristics to them can be introduced into the system as added classifiers, this expanding the scope of the invention form face detection to generic automatic orientation detection using generic image object analysis.

Another embodiment includes scene recognition method and a system using brightness and ranging mapping (see, e.g., US published patent application 2001/0031142 to Whiteside, incorporated by reference). Auto-ranging and/or brightness measurement may be used as orientation specific features for this invention.

In further preferred and alternative embodiments, the orientation may be suggested to a user in the acquisition device after the image has been acquired or captured by a camera (see, e.g., U.S. Pat. No. 6,516,154 to Parulski et al., incorporated by reference). According to these embodiments, a user may confirm the new orientation before saving a picture or before deciding to re-save or delete the picture. The user may choose to re-take a picture using different settings on the camera. Suggestion for improvements may be made by the camera user-interface.

In preferred embodiments herein, automatically or semi-automatically improving the appearance of faces in images based on automatically and/or manually detecting such facial images in the digital image is an advantageous feature (see also US published patent application 20020172419, to Lin et al., incorporated by reference) Lightness contrast and color level modification of an image may be performed to produce better results. Moreover, using such information for detecting orientation, may provide assistance as part of an in-camera acquisition process to perform other face related operations such as composition or a slide show as may be recited at U.S. patent application Ser. No. 10/608,772, filed Jun. 26, 2003, hereby incorporated by reference.

Based on the detection of the correct orientation, Image enhancement according to preferred and alternative embodiment herein may be applied to a face region or face regions only, or the enhancement may be applied to the entire image, or selective and distinct corrections may be applied to both background and foreground regions, particularly facial regions, based on knowledge of the presence of faces in the image and/or other image regions such as blue sky or other detectable features.

In further embodiments, various schemes may be used for selecting an area or areas of interest from an electronically captured image, most preferably areas including faces or facial regions (see also UK patent application number GB0031423.7 entitled "automatic cropping of electronic images", incorporated by reference). Regions of interest may be automatically or semi-automatically selected within an image in response to a selection signal (see, e.g., US published patent application 2003/0025812, incorporated by reference).

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A digital image acquisition device, comprising a lens and image sensor for acquiring a digital image, a processor, and memory having code embedded therein for programming the processor to perform a method of determining an orientation state of a digital image, wherein the method comprises:
    acquiring a digital image;
    detecting one or more face regions within the acquired digital image, including contemporaneously determining an orientation state of the digital image, including:
    applying a combined face classifier set, that includes one or more rotation invariant classifiers and three or more sets of orientation-specific classifiers, to said digital image, wherein each of the one or more rotation invariant classifiers is common to individual versions of each of the orientation-specific classifiers and included only once in the combined face classifier, and wherein each set of the three or more sets of orientation-specific classifiers is rotated relative to the other sets of orientation-specific classifiers; and
    based on results of said applying said combined face classifier set to the digital image, determining an orientation state of the digital image as an orientation among three or more orientations corresponding respectively to the three or more orientation-specific classifier sets with a highest probability of detection of one or more face regions.

2. The device of claim 1, wherein the method further comprises calculating an integral image representation of said digital image.

3. The device of claim 2, wherein the applying said combined face classifier set to said digital image is performed with regard to the integral image representation.

4. The device of claim 1, wherein the digital image comprises a portrait or upright face image, or both.

5. The device of claim 1, wherein the method further comprises cropping and resizing said one or more face regions to a standardized size.

6. The device of claim 5, wherein the cropping and resizing precedes application of certain classifiers of the combined face classifier set.

7. The device of claim 5, wherein the applying said combined face classifier set to said digital image precedes said resizing.

8. The device of claim 1, wherein the combined face classifier set comprises one or more binary classifiers.

9. The device of claim 1, wherein the combined face classifier set comprises a cascade of classifiers.

10. The device of claim 1, wherein the combined face classifier set comprises more than three orientation-sensitive classifiers.

11. The device of claim 1, wherein the applying said combined face classifier set further comprises resizing one or more face regions to a standardized size, and adjusting one or more classifiers of the combined face classifier set according to the resizing.

12. The device of claim 1, wherein the applying said combined face classifier set comprises applying said combined face classifier set at more than one scale.

13. The device of claim 1, wherein the method further comprises generating in-camera, capturing or otherwise obtaining in-camera a collection of low resolution images including said one or more face regions, wherein said determining said orientation state is based on analyzing said low resolution images.

14. The device of claim 1, wherein the method further comprises determining a further action based on said orientation state.

15. A method of determining an orientation state of a digital image, comprising:
   using a processor programmed by embedded digital code within a processor-readable medium;
   acquiring a digital image using an image sensor;
   detecting one or more face regions within the acquired digital image, including contemporaneously determining an orientation state of the digital image, including:
   applying a combined face classifier set, that includes one or more rotation invariant classifiers and three or more sets of orientation-specific classifiers, to said digital image, wherein each of the one or more rotation invariant classifiers is common to individual versions of each of the orientation-specific classifiers and included only once in the combined face classifier, and wherein each set of the three or more sets of orientation-specific classifiers is rotated relative to the other sets of orientation-specific classifiers; and
   based on results of said applying said combined face classifier set to the digital image, determining an orientation state of the digital image as an orientation among three or more orientations corresponding respectively to the three or more orientation-specific classifier sets with a highest probability of detection of one or more face regions.

16. The method of claim 15, further comprising calculating an integral image representation of said digital image.

17. The method of claim 16, wherein the applying said combined face classifier set to said digital image is performed with regard to the integral image representation.

18. The method of claim 15, wherein the digital image comprises a portrait or upright face image, or both.

19. The method of claim 15, further comprising cropping and resizing said one or more face regions to a standardized size.

20. The method of claim 19, wherein the cropping and resizing precedes application of certain classifiers of the combined face classifier set.

21. The method of claim 19, wherein the applying said combined face classifier set to said digital image precedes said resizing.

22. The method of claim 15, wherein the combined face classifier set comprises one or more binary classifiers.

23. The method of claim 15, wherein the combined face classifier set comprises a cascade of classifiers.

24. The method of claim 15, wherein the combined face classifier set comprises more than three orientation-sensitive classifiers.

25. The method of claim 15, wherein the applying said combined face classifier set further comprises resizing one or more face regions to a standardized size, and adjusting one or more classifiers of the combined face classifier set according to the resizing.

26. The method of claim 15, wherein the applying said combined face classifier set comprises applying said combined face classifier set at more than one scale.

27. The method of claim 15, further comprising generating in-camera, capturing or otherwise obtaining in-camera a collection of low resolution images including said one or more face regions, wherein said determining said orientation state is based on analyzing said low resolution images.

28. The method of claim 15, further comprising determining a further action based on said orientation state of said digital image.

29. One or more non-transitory processor-readable media having code embedded therein for programming the processor to perform a method of determining an orientation state of an acquired digital image, wherein the method comprises:
   detecting one or more face regions within an acquired digital image, including contemporaneously determining an orientation state of the digital image, including:
   applying a combined face classifier set, that includes one or more rotation invariant classifiers and three or more sets of orientation-specific classifiers, to said digital image, wherein each of the one or more rotation invariant classifiers is common to individual versions of each of the orientation-specific classifiers and included only once in the combined face classifier, and wherein each set of the three or more sets of orientation-specific classifiers is rotated relative to the other sets of orientation-specific classifiers; and
   based on results of said applying said combined face classifier set to the digital image, determining an orientation state of the digital image as an orientation among three or more orientations corresponding respectively to the three or more orientation-specific classifier sets with a highest probability of detection of one or more face regions.

30. The one or more processor-readable media of claim 29, wherein the method further comprises calculating an integral image representation of said digital image.

31. The one or more processor-readable media of claim 30, wherein the applying said combined face classifier set to said digital image is performed with regard to the integral image representation.

32. The one or more processor-readable media of claim 29, wherein the digital image comprises a portrait or upright face image, or both.

33. The one or more processor-readable media of claim 29, wherein the method further comprises cropping and resizing said one or more face regions to a standardized size.

34. The one or more processor-readable media of claim 33, wherein the cropping and resizing precedes application of certain classifiers of the combined face classifier set.

35. The one or more processor-readable media of claim 33, wherein the applying said combined face classifier set to said digital image precedes said resizing.

36. The one or more processor-readable media of claim 29, wherein the combined face classifier set comprises one or more binary classifiers.

37. The one or more processor-readable media of claim 29, wherein the combined face classifier set comprises a cascade of classifiers.

38. The one or more processor-readable media of claim 29, wherein the combined face classifier set comprises more than three orientation-sensitive classifiers.

39. The one or more processor-readable media of claim 29, wherein the applying said combined face classifier set further comprises resizing one or more face regions to a standardized size, and adjusting one or more classifiers of the combined face classifier set according to the resizing.

40. The one or more processor-readable media of claim 29, wherein the applying said combined face classifier set comprises applying said combined face classifier set at more than one scale.

41. The one or more processor-readable media of claim 29, wherein the method further comprises generating in-camera, capturing or otherwise obtaining in-camera a collection of low resolution images including said one or more face regions, wherein said determining said orientation state is based on analyzing said low resolution images.

42. The one or more processor-readable media of claim 29, wherein the method further comprises determining a further action based on said orientation state.

* * * * *